United States Patent [19]
Ellis, III

[11] Patent Number: 4,579,242
[45] Date of Patent: Apr. 1, 1986

[54] MOLDED PLASTIC PRESSURE TANK

[75] Inventor: George S. Ellis, III, Chardon, Ohio

[73] Assignee: Kinetico, Inc., Newbury, Ohio

[21] Appl. No.: 759,957

[22] Filed: Jul. 29, 1985

[51] Int. Cl.⁴ .............................................. B65D 7/42
[52] U.S. Cl. .................................. 220/5 A; 220/4 B; 220/67; 215/1 C
[58] Field of Search ................. 220/5 A, 5 R, 4 B, 3, 220/67, 75, 76, DIG. 29, 4 E; 215/1 C

[56] References Cited

U.S. PATENT DOCUMENTS

| | | | |
|---|---|---|---|
| 2,720,332 | 10/1955 | Holt | 220/4 |
| 3,100,172 | 8/1963 | Nier | 156/228 |
| 3,292,811 | 12/1966 | Lynch | 220/4 |
| 3,342,365 | 9/1967 | Lux et al. | 220/4 B |
| 3,454,179 | 7/1969 | Kerr | 220/4 |
| 3,574,031 | 4/1971 | Heller, Jr. et al. | 156/273 |
| 3,706,393 | 12/1972 | Curtis et al. | 220/67 |
| 4,035,547 | 7/1977 | Heller, Jr. et al. | 428/329 |
| 4,067,765 | 1/1978 | Heller, Jr. et al. | 156/272 |
| 4,239,575 | 12/1980 | Leatherman | 156/272 |

FOREIGN PATENT DOCUMENTS 2118863 8/1972 France.
690644 7/1965 Italy.

Primary Examiner—Steven M. Pollard
Attorney, Agent, or Firm—Watts, Hoffmann, Fisher & Heinke Co.

[57] ABSTRACT

The improved tank construction includes two injection molded thermoplastic sections having overlapping male and female circumferential wall portions. The male wall portion includes a crowned bonding surface that diverges inwardly towards the central axis of the tank. The bonding surface extends from an external surface of the male tank section and terminates at a radial face that defines the innermost edge of the tank section. The female wall portion defined by the female tank section includes a uniform diameter segment which cooperates with the external surface of the male tank section to facilitate alignment during the spin welding process. A complementally shaped bonding surface forms part of the female wall portion which coacts with the crowned bonding surface of the male wall portion. Contact between the bonding surfaces at the commencement of the spin welding process occurs at a narrow intermediate region.

5 Claims, 3 Drawing Figures

MOLDED PLASTIC PRESSURE TANK

TECHNICAL FIELD

The present invention relates generally to molded, plastic pressure tanks, and more specifically to a pressure tank comprised of injection molded sections that are bonded together in an improved manner to form a strong, integral structure.

BACKGROUND ART

Molded, plastic pressure tanks, such as are used in the water softener industry, have been made by laying up glass fiber matting in a confining mold, impregnating the matting with a suitable synthetic resin, and curing the resin while pressurizing the matting inside the mold with an inflatable bag. Another known procedure has involved laying up windings of reinforcing strands on a collapsible mandrel or inflatable bag, impregnating the windings with resin, and curing the resin to form a reinforced, cylindrical tank wall. Both molding techniques are expensive and often difficult to carry out successfully. The molding problems include shifting of the matting or windings in the mold and entrapped air in the resin, etc. all of which can adversely affect burst strength and tank life. Another disadvantage is the general inability to conveniently mold ports, threads, internal bosses, ribbing, and other detail.

For some applications it is desirable to mount structure such as distribution conduits within the tank. When the entire tank is molded as an integral unit, access to the interior of the tank is severely restricted. Access is normally provided by an inlet/outlet opening that is typically molded at one end of the tank. Any components mounted within the tank must therefore be smaller than the inlet/outlet opening.

Attempts have been made in the past to produce pressure tanks by injection molding them in sections and then bonding the sections together in a separate operation. The tanks produced in this manner have been characterized by a butt joint formed between overlapped edge portions of the molded sections. The typical butt joint is formed by an annular recess in the edge of the inner one of the overlapping sections. The recess is closed by the overlapping outer section to form an annular pocket that captures or encloses a fusion bonding filler material.

The geometry of the typical butt joint severely limits the strength of the finished tank. Bursting pressure tests have shown that failure at the joint is circumferential rather than longitudinal. This indicates that failure is not due to hoop stress, but rather to a combination of axial and bending stresses. The failure inducing bending stress is believed to be the result of a radial misalignment between the axial wall force and the reaction force through the joint.

DISCLOSURE OF THE INVENTION

The present invention provides a new and improved process for manufacturing plastic pressure tanks. According to the invention, the tanks are formed from injection molded sections that are joined together using a spin welding process. The parameters for the spin welding process produce a bond between the tank sections characterized by high bursting strength. The process itself is relatively inexpensive and eliminates the need for bonding agents or the like.

According to the invention, the improved tank construction comprises at least two injection molded, thermoplastic sections having overlapping, circumferential wall portions. One tank section defines an inner or male circumferential wall portion that fits within an outer or female circumferential wall portion defined by the other tank section.

The male wall portion is defined by a bonding surface that diverges inwardly, i.e., towards a central axis of the tank. This bonding surface extends from an external surface of the one tank section and terminates at a radial face defining an innermost edge of the section. A recess or shoulder is formed between the radial face and an inner surface of the one tank section.

The female wall portion defined by the other tank section includes a uniform diameter segment which conforms substantially to the dimension of the external surface of the one tank section. The female wall portion also defines a surface that is inclined toward the axis of the tank and forms another bonding surface which coacts with the bonding suface formed on the male tank section when the sections are assembled. A slight recess is formed near an inner surface of the other tank section which is adapted to receive the radial end face of the one tank section. A projection formed between the recess and the radial inner surface of the other tank section mates during assembly with the shoulder or recess formed in the one tank section.

According to the invention, the bonding surfaces of the respective tank sections are configured to provide only a minimal region of contact when the tank halves are initially brought toether. To achieve this feature, one of the bonding surfaces, preferably the bonding surface defined by the male wall portion, is radiused slightly so that it makes contact with the bonding surface of the outer wall portion of the other tank section at a narrow, intermediate region. With the preferred construction, substantially tangential contact is made between the bonding surfaces when the tank halves are initially assembled.

The individual tank halves are fused utilizing a spin welding process. Since the bonding surfaces make initial contact at an intermediate region, fusion begins at the point of contact and migrates in either direction, i.e., towards the interior of the tank and towards the outer periphery of the tank joint. With this bonding configuration, it has been found that a reliable and effective fusion bond can be achieved with a spin welding process.

To produce tanks from an engineering thermoplastic resin such as polyethylene-terephthalate sold by DuPont under the tradename Rynite 530, utilizing the principles of the present invention, the following spin welding parameters have been found to provide satisfactory results. One or both tank sections are rotated to produce an effective relative surface speed between the tank sections (at the joint region) of 1,210 ft. per minute. While rotating the tank sections are brought together with a clamping force of substantially 150 psi. It has been found that for a tank having a 6" diameter, a properly formed fusion bond is generated in about 1.5 seconds. For a 8" tanks, the fusion time is approximately 1.75 seconds. It is believed that these spin welding parameters can be varied by 5% to 10% without substantially reducing bond strength.

It has been found that the fused joint between the tank sections produced by the disclosed fusing method, has a bursting strength at least as great as the overall bursting strength of the tank walls. The joint is capable of easily withstanding the normally expected bending stress produced at the joint when the tank is pressurized.

The disclosed method provides an inexpensive and reliable means for producing plastic pressure tanks. It is believed that tanks produced by this method are as strong as the tanks produced by other molding techniques, but are less costly to produce. Since the tanks are assembled from tank sections, plumbing, distributors, etc., can be placed within the tank prior to assembly. These devices are not limited in size to the tank opening as is the case with many prior art tank assemblies.

Additional features of the invention will become apparent and a fuller understanding obtained by reading the following detailed description made in connection with the accompanying drawings.

BEST MODE FOR CARRYING OUT THE INVENTION

Figure 1:
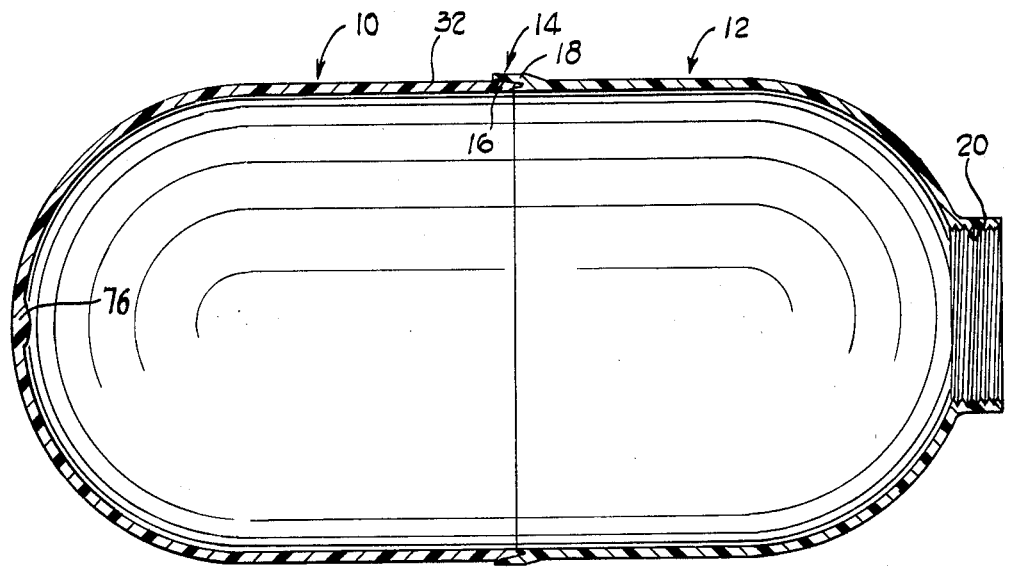
FIG. 1 illustrates the overall construction of a tank embodying the present invention.

FIG. 1 illustrates the overall construction of the tank embodying the present invention. In the disclosed embodiment, the tank is cylindrical in shape and is formed from two tank halves 10, 12. The tank halves are united at a joint indicated generally by the reference character 14, the joint being formed using the process of the present invention. The left half of the tank (as viewed in FIG. 1) includes a male peripheral wall portion 16, (shown best in FIG. 2a) that mates with a female peripheral wall portion 18 (shown best in FIG. 2b) forming part of the right tank half 12. In the illustrated embodiment, the right tank half defines a threaded neck 20 by which the tank is connected to peripheral plumbing or other fluid system. It should be understood that the male and female wall portions 16, 18 can be reversed, i.e., the female wall portion 18 can be made part of the left tank half 10.

Figures 2A, 2B:
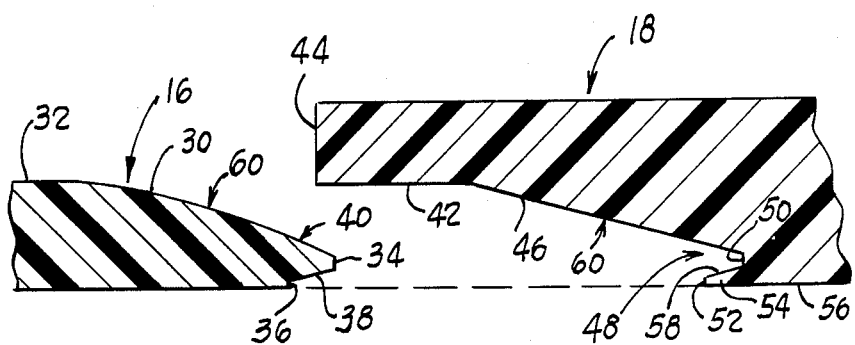
FIG. 2a is a fragmentary sectional view of a male wall portion of one tank section.
FIG. 2b is a fragmentary view of a female wall portion of a mating tank section.

Referring in particular to FIG. 2a, the male half of the joint is detailed. It comprises a bonding surface 30 extending from an external, uniform cylindrical surface 32 (that defines the exterior of the tank half 10) to a substantially radial end face 34 which forms the termination of the tank half 10. The male joint also includes a shallow, internal shoulder 36 spaced from the radial end face 34 by a tapered surface 38. As seen in FIG. 2a, the overall male section of the joint tapers in cross section in a region between the uniform cylindrical surface 32 and the radial end face 34. For a substantial portion of this region, the taper is directed inwardly towards the axis of the tank. However, a region indicated generally by the reference character 40 near the radial end face 34, tapers in a direction, substantially parallel to the axis of the tank, since it is defined by both the inwardly tapering bonding surface 30 and the outwardly tapering surface 38.

The female wall portion 18 of the joint is illustrated in FIG. 2b. As seen in FIG. 1, this female wall portion defines tank structure that is larger in diameter than the overall cylindrical diameter of the tank. The female section of the joint itself, includes an internal surface 42 having a substantially uniform diameter extending from an external radial end face 44 to the commencement of an internal bonding surface 46. During the bonding process, the female bonding surface 46 mates with the male bonding surface 30 formed on the male wall section. The bonding surface 46 diverges inwardly towards the axis of the tank and defines an increasing cross section for that portion of the joint. The bonding surface 46 extends from the uniform diameter surface 42 to the base of a recess indicated generally by the reference character 48. The recess is defined by a lip 54 formed by a substantially radial surface 50 spaced inwardly from a terminating radial end face 52 that merges with an internal surface 56 of the tank half 12. The terminating radial end face 52 is spaced from the base of the recess by a tapered surface 58.

It should be apparent from FIGS. 2a, 2b that the male and female portions of the joint are formed somewhat complementally. According to the invention, however, at least one of the bonding surfaces 30, 46 is crowned so that initial contact between the surfaces when the welding process commences, occurs somewhat tangentially, preferably intermediate the ends of the bonding surfaces. In particular, bonding begins between the bonding surfaces 30, 46 at a location indicated by the reference character 60, located intermediate the commencement of the uniform diameter portion 42 and the base surface 50 of the recess 48. Bonding proceeds from the point of contact in both directions, i.e., towards the uniform diameter segment 42 and the base surface 50.

This construction assures uniform bonding along the bonding surfaces and also assures that the male section is not inserted too far into the female section during the bonding process. If the bonding or melt were initiated near the tip or radial end face 34 of the male section, the lip 54 formed on the female section would weaken and would allow the male tank section to move inwardly into the female tank section an excessive amount.

Although either the bonding surface 30 or the bonding surface 46 can be crowned to arrive at the desired geometry, in the preferred and illustrated embodiment, the bonding surface 30 on the male tank section is formed with the crown.

According to a feature of the invention, the lip formed on the female section traps or blocks the melting material and inhibits the flow of material into the interior of the tank which could weaken the connection. In the preferred process, the tank halves are positioned or chucked into a spinning apparatus which is operative to produce relative rotation between the tank halves. The uniform cylindrical surface 42 on the female tank half conforms and cooperates with the external surface 32 of the male tank half to align the tank sections during the mounting or chucking step, assuring that the tank halves will mate properly during the spin welding process.

The disclosed process has been used to produce 6" and 8" tanks from an engineering thermoplastic material such as polyethylene terephthalate which is sold by DuPont under the tradename Rynite 530. The preferred material is 30% glass filled for added reinforcement. It has been found that the following spin welding parameters produce tanks which have been able to meet the strength requirements required in the fluid processing industry.

To effect the weld, one tank half is rotated such that a relative surface speed of 1210 ft. per minute is achieved between the tank sections. It should be noted that both tank halves could be rotated if desired in order to arrive at the above referenced, relative surface speed. The tank halves are then brought together with a clamping force of approximately 150 psi. For a 6" tank, it has been found that a spin time of approximately 1.5 seconds produces an excellent weld. For an 8" tank, a spin time of 1.75 seconds produces an excellent weld.

It has also been found that the unit loading can be varied by ±10% and still achieve a proper weld. Surface speed can be varied ±5% whereas the welding times can be varied ±0.05 seconds.

To add even further strength to the tank construction, the tank halves are molded such that strengthening fibers in the material are oriented substantially axially, at least in the region of the joint. The orientation of the fibers is preferably obtained by gating the material during the molding process at a central point on the tank section. In the case of the male tank section, the material would be gated at the leftmost end (as viewed in FIG. 1), and indicated by the reference character 76. In the case of the female tank half, the material would be gated at the neck region 20.

It is believed that superior strength results from orienting the fibers in the axial direction because, during the welding process, ends of the fibers near the bonding surfaces 30, 46 of the tank halves are exposed and protrude and become commonly fused in the melt that occurs between the bonding surfaces.

Although the invention has been described with a certain degree of particularity, it should be understood that those skilled in the art can make various changes to it without departing from the spirit or scope of the invention as hereinafter claimed.

I claim:

1. A spin welded tank joint for joining two thermoplastic tank sections, comprising:
   (a) a male joint portion including a male bonding surface extending from a uniform diameter, external surface to a substantially radial end face;
   (b) an internal shoulder spaced inwardly with respect to said radial end face and joined to the radial end face by a tapered surface extending between the shoulder and the radial end face;
   (c) said male bonding surface diverging substantially inwardly towards an axis of said tank section and at least partially defining a cross section that narrows from said external surface to said radial end face;
   (d) said tapered surface being substantially shorter than said bonding surface and defining a tip-like region tapering at a greater rate than the overall narrowing of the bonding region;
   (e) a female joint section including:
      (i) a substantially uniform internal diameter segment defining an alighment surface cooperating with said external surface of said male tank section to align said sections during a bonding process;
      (ii) a bonding surface extending from said uniform diameter portion to a base surface of a recess defined between an internal lip and said bonding surface;
      (iii) said lip defined by a substantially radial end face spaced outwardly with respect to said base surface and connected with said base surface by a tapered surface;
   (f) one of said male and female bonding surfaces being crowned such that when said tank halves are initially assembled, contact between said male and female bonding surfaces occurs intermediate the uniform diameter alignment surface and base surface of said female tank section.

2. The apparatus of claim 1 wherein said male bonding surface is crowned and said female bonding surface is substantially linear.

3. A method for producing fluid tanks from molded thermoplastic tank sections, comprising the steps of:
   (a) forming a crowned bonding surface on a male tank section spaced inwardly from a radial end face by a tapered surface;
   (b) forming a uniform diameter, internal surface on a female tank section, the diameter of said uniform surface being substantially equal to the diameter of the external surface on said male tank section;
   (c) forming a bonding surface on said female tank section extending from said uniform diameter internal surface to a radial base surface forming part of said female tank section;
   (d) forming an internal lip on said female tank section extending toward said male section when said sections are assembled such that a recess is formed between said lip and said female bonding surface;
   (e) assembling said tank sections and allowing said uniform diameter surface of said female tank section to cooperate with the external surface of the male section to produce substantial alignment of said sections, while mounting said sections in a spin welding apparatus;
   (f) rotating at least one tank section to produce a relative surface speed at said male and female bonding surfaces of substantially 1,210 ft. per minute while urging said tank sections towards each other with a unit loading of 150 psi;
   (g) rotating the one tank section while maintaining said unit loading for a predetermined time to achieve a uniform bond across said bonding surfaces.

4. The method of claim 3 wherein said tank sections are substantially 8" in diameter and said one tank section is rotated for substantially 1.75 seconds while maintaining the specified unit loading and surface speed.

5. The method of claim 3 wherein said tank sections are substantially 6" in diameter and said one tank section is rotated for substantially 1.5 seconds while maintainng the specified unit loading and surface speed to achieve bonding between said bonding surfaces.

* * * * *